US009229608B2

(12) United States Patent
Hosokawa (10) Patent No.: US 9,229,608 B2
(45) Date of Patent: Jan. 5, 2016

(54) CHARACTER DISPLAY APPARATUS, CHARACTER DISPLAY METHOD, AND COMPUTER READABLE MEDIUM (71) Applicant: Sharp Kabushiki Kaisha, Osaka-shi, Osaka (JP)

(72) Inventor: Teppei Hosokawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/168,253

(22) Filed: Jan. 30, 2014

(65) Prior Publication Data

US 2014/0212043 A1 Jul. 31, 2014

(30) Foreign Application Priority Data

Jan. 31, 2013 (JP) .................................. 2013-017479

(51) Int. Cl.
*G06K 9/00* (2006.01)
*G06F 3/048* (2013.01)

(52) U.S. Cl.
CPC ...................................... *G06F 3/048* (2013.01)

(58) Field of Classification Search
CPC ...... G06K 9/00409; G06K 9/222; G06F 3/03; G09G 5/00; G06T 11/00; G06T 1/20; G06T 11/0011
See application file for complete search history.

(56) References Cited

U.S. PATENT DOCUMENTS

| 5,526,476 | A | | 6/1996 | Motokado et al. | |
|---|---|---|---|---|---|
| 5,687,254 | A | * | 11/1997 | Poon et al. | 382/229 |
| 5,821,514 | A | | 10/1998 | Kikuchi et al. | |
| 8,085,251 | B2 | * | 12/2011 | Harada et al. | 345/173 |
| 8,948,514 | B2 | * | 2/2015 | Ookawara | 382/189 |
| 2003/0214490 | A1 | * | 11/2003 | Cool | 345/179 |
| 2014/0152543 | A1 | * | 6/2014 | Hirabayashi | 345/156 |
| 2014/0212043 | A1 | * | 7/2014 | Hosokawa | 382/189 |
| 2014/0313216 | A1 | * | 10/2014 | Steingrimsson | 345/589 |

FOREIGN PATENT DOCUMENTS

| JP | 06-175639 A | 6/1994 |
|---|---|---|
| JP | 2002-82663 A | 3/2002 |
| JP | 2009-122887 A | 6/2009 |
| JP | 2012-230722 A | 11/2012 |

* cited by examiner

*Primary Examiner* — Amir Alavi
(74) *Attorney, Agent, or Firm* — Keating & Bennett, LLP (57) ABSTRACT A character display apparatus, a character display method, and a non-transitory computer readable medium storing a character display program are capable of automatically avoiding a handwriting character being illegible during input of the character by detecting an overlap between lines to be drawn during drawing based on trajectory data of a handwriting character to determine a presence/absence of an illegible part. If it is determined that an illegible part is present, the thickness of the handwriting character is automatically selected again to be thinner and the image of the handwriting character is drawn again, which avoids illegible part occurring in the handwriting character without inputting the character all over again.

8 Claims, 9 Drawing Sheets

CHARACTER DISPLAY APPARATUS, CHARACTER DISPLAY METHOD, AND COMPUTER READABLE MEDIUM

CROSS-REFERENCE TO RELATED APPLICATIONS

This Non-provisional application claims priority under 35 U.S.C.§119(a) on Patent Application No. 2013-17479 filed in Japan on Jan. 31, 2013, the entire contents of which are hereby incorporated by reference.

BACKGROUND

1. Technical Field

The present invention relates to a character display apparatus and a character display method for accepting and displaying an input free-handwriting character, and more specifically, to a character display apparatus and a character display method capable of avoiding a character being illegible when displayed.

2. Description of Related Art

An input apparatus, such as a pen input system and a display with a built-in touch panel, allows a free-handwriting character to be saved and displayed as image data without modification. Here, the user designates the type or thickness of a pen, brush or the like to be used for drawing an image of a character, and the image of an input handwriting character is drawn with a pen or the like of the designated type and thickness. When the input handwriting character has a large number of strokes, the character may be squashed and thus illegible depending on the type of a selected pen or the like.

A conventional technique proposes to perform processing of determining, as to legibility of a font character which is not a free-handwriting character, whether or not strokes (lines) are in contact with one another by comparing the number of strokes and the number of intervals in the same direction of the character, and thinning the strokes that are in contact with each other.

SUMMARY OF THE INVENTION

As to whether or not a handwritten character is illegible, the user who input the handwritten character sees for him/herself to make a determination therefor, and if the handwritten character has an illegible part, the user him/herself needs to appropriately re-designate the type or thickness of the pen and to input the character or sentence again from the beginning. This causes the user to perform complicated operation.

The present invention has been made in view of the circumstances described above, and has an object to provide a character display apparatus, a character display method and a computer readable medium storing computer program that are capable of automatically avoiding a handwriting character being illegible during input.

According to the present invention, when it is determined that an illegible part is present in a handwriting character during input, the handwriting character is automatically thinned to be displayed, thereby automatically avoiding the handwriting character being illegible.

The above and further objects and features of the invention will more fully be apparent from the following detailed description with accompanying drawings.

DETAILED DESCRIPTION

The present invention will be described below with reference to drawings illustrating the embodiment thereof.

Figure 1:
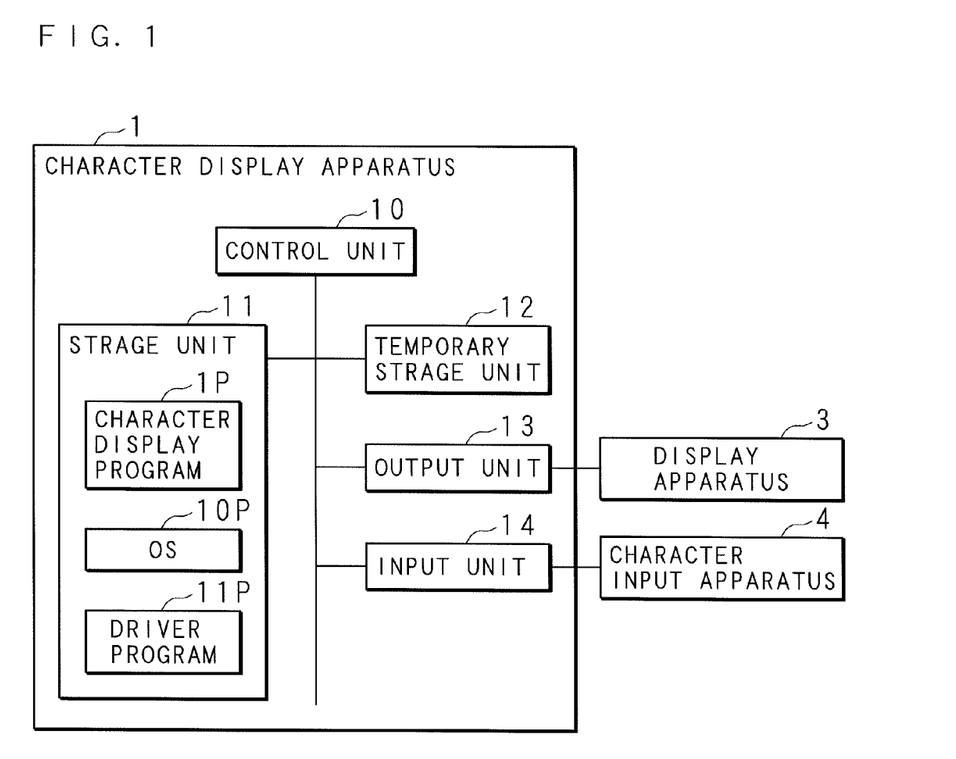
FIG. 1 is a block diagram illustrating a configuration of a character display apparatus according to an embodiment of the present invention.

FIG. 1 is a block diagram illustrating a configuration of a character display apparatus 1 according to an embodiment of the present invention. A personal computer is used for the character display apparatus 1. The character display apparatus 1 includes a control unit 10, a storage unit 11, a temporary storage unit 12, an output unit 13 and an input unit 14. The character display apparatus 1 is connected to the display apparatus 3 through the output unit 13, and is connected to the character input apparatus 4 through the input unit 14.

A CPU (Central Processing Unit) is used for the control unit 10. The control unit 10 operates based on an OS (Operating System) 10P, a driver program 11P and a character display program 1P stored in the storage unit 11.

An HDD (Hard Disk Drive) or an SDD (Solid State Drive) is used for the storage unit 11. The storage unit 11 stores therein the OS 10P, driver program 11P and character display program 1P described above. The storage unit 11 further stores therein various kinds of data referred by the control unit 10.

The OS 10P is a basic computer program for making the control unit 10 input information from the character input apparatus 4 and output information to an output device such as the display apparatus 3, to control execution of the application program such as the character display program 1P or the like. The driver program 11P is a computer program for appropriately convert and interpret data to the display apparatus 3 and data from the character input apparatus 4 at a physical layer and to input/output the data to the control unit 10 which is based on the OS 10P. The character display program 1P is an application program for implementing the input and display of a handwriting character, which will be described later.

For the temporary storage unit 12, a RAM such as a DRAM (Dynamic Random Access Memory) and an SRAM (Static Random Access Memory) is used. The temporary storage unit 12 temporality stores information generated by the processing in the control unit 10.

The output unit 13 is an interface which is connected to the display apparatus 3. The display apparatus 3 is a display using a liquid-crystal panel. The control unit 10 draws a graphical image of image data to be displayed on the display apparatus 3 based on the OS 10P and character display program 1P, and outputs the image data from the output unit 13 to the display apparatus 3. It is noted that the character display apparatus 1 may also include a GPU (Graphical Processing Unit) for drawing graphical images, separately from the control unit 10.

The input unit 14 is an interface which is connected to the character input apparatus 4. The character input apparatus 4 has a touch panel and outputs, when a user's finger or a touch pen comes into contact with a touch panel, information on the coordinates for the point where the contact begins, and continues to output such coordinate information for contact points at predetermine intervals until non-contact of the finger or touch pen is detected. When non-contact of the finger or touch pen is detected from the touch panel, the character input apparatus 4 outputs the coordinate information for the final contact point as the coordinate information at the point where the contact ends. The input unit 14 reports the information obtained from the character input apparatus 4 to the control unit 10.

The character display apparatus 1 is configured to be connected with both the display apparatus 3 and the character input apparatus 4 that are physically different from each other. The present invention is, however, not limited to the configuration above but may also employ the display apparatus 3 and character input apparatus 4 that are integrally configured as a display with a built-in touch panel, which is connected to the character display apparatus 1, i.e. a personal computer. Alternatively, the display apparatus 3 and character input apparatus 4 may be included in the character display apparatus 1, that is, a personal computer of a tablet type having a display with a built-in touch panel may be employed.

In the character display apparatus 1 configured as described above, the control unit 10 operates based on the OS 10P and driver program 11P, to implement the display of a character input from the character input apparatus 4 onto the display apparatus 3. Therein the control unit 10 draws the image of the handwriting character during being input and outputs the graphical image data to the display apparatus 3, based on the data of the handwriting character to be input at the character input apparatus 4. Furthermore, the control unit 10 operates based on the character display program 1P so as to avoid a handwriting character being illegible.

The processing of the control unit 10 will now be described determining, based on the character display program 1P, whether or not an illegible part is present in a handwriting character while the image is being drawn, and automatically adjusting the thickness of the character when it is determined that an illegible part is present.

Figure 2:
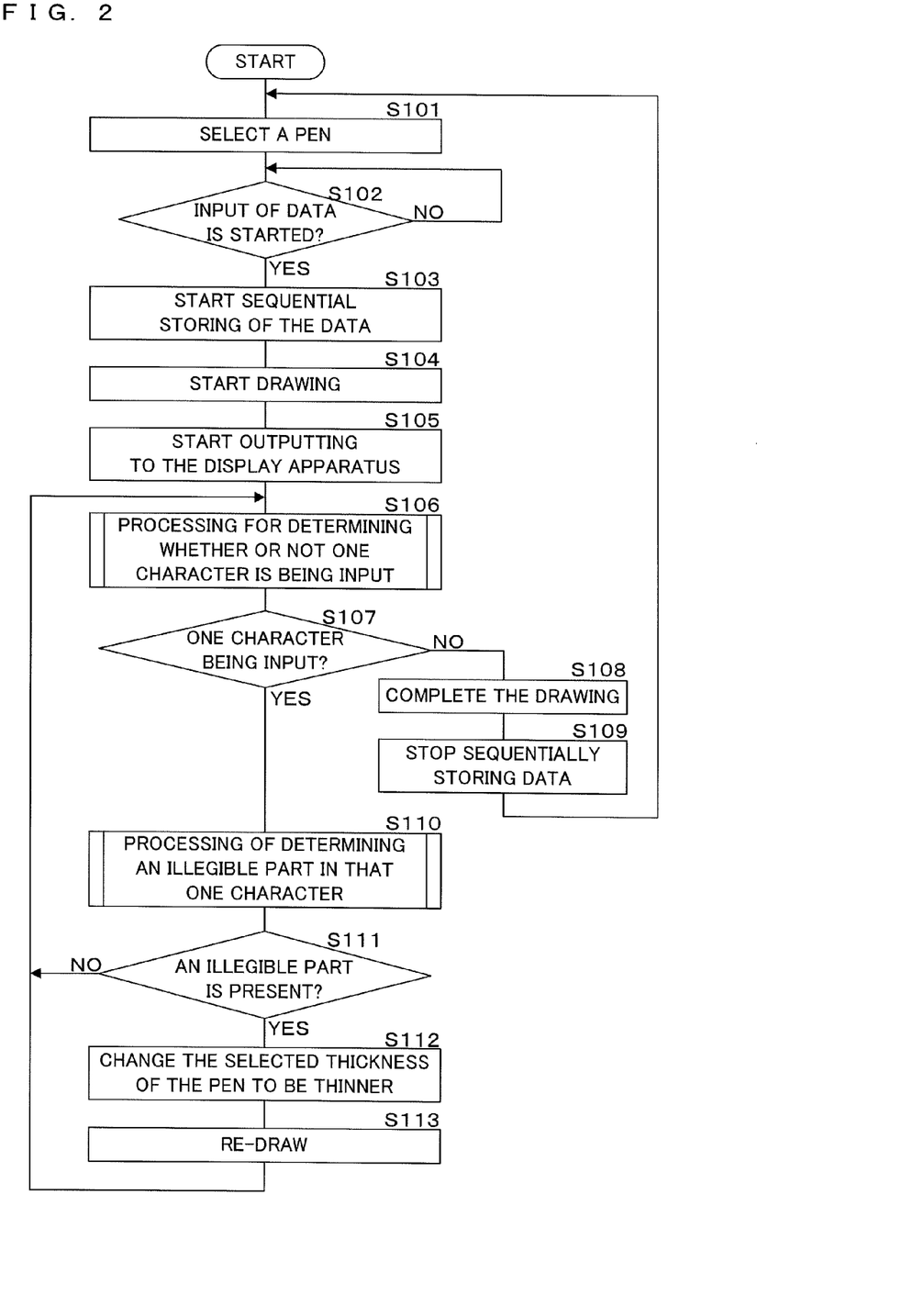
FIG. 2 is a flowchart illustrating an example of a processing procedure performed by a character display apparatus according to an embodiment of the present invention.

FIG. 2 is a flowchart illustrating an example of a processing procedure performed on the basis of the character display program 1P in the control unit 10 of the character display apparatus 1 according to the present embodiment. When the control unit 10 starts (activates) the execution of the character display program 1P, the processing described below is executed.

The control unit 10 selects a pen of a predetermined type and thickness (step S101). The predetermined type and thickness initially means the type and thickness that are set in advance, and may be the type and thickness that had been set and saved when the character display program 1P was executed the previous time.

The control unit 10 determines whether or not input of trajectory data (coordinate information) from the character input apparatus 4 is started, that is, whether or not the contact of a finger or touch pen with a touch panel is detected (step S102). If it is determined that the input of data from the character input apparatus 4 is not started (NO at step S102), the control unit 10 waits until the input operation is performed at the character input apparatus 4.

If it is determined that the input of data from the character input apparatus 4 is started (YES at S102), the control unit 10 obtains data (coordinate information) from the character input apparatus 4 and starts sequential storing of the data into the temporary storage unit (step S103). The control unit 10 starts drawing the image of a pen-tip traces of the selected type and thickness based on the data obtained and temporarily stored at step S103 (step S104), and outputs the result of drawing from the output unit 13 to the display apparatus 3 (step S105). This allows free handwriting input from the character input apparatus 4.

The control unit 10 executes processing for determining whether or not one character is being input for the drawing of traces based on sequentially-stored data (step S106). The processing at S106 for determining whether or not one character is being input will be described in detail below.

The control unit 10 determines, from the result of the processing at step S106, whether or not one character is being input (step S107). If it is determined that one character is not being input, i.e., the trace being input is not a trace of character, or that the input of one character is completed (NO at step S107), the control unit 10 completes the drawing (step S108). Moreover, the control unit 10 stops obtaining and sequentially storing data, which were started at step S103 (step S109), and returns the processing to step S101. The processing is repeatedly executed until an instruction for terminating the application program of the character display program 1P is given.

If it is determined that one character is being input at step S107 (YES at S107), the control unit 10 executes processing of determining presence/absence of an illegible part in that one character (step S110). The processing of determining presence/absence of an illegible part at step S110 will be described later.

The control unit 10 determines whether or not an illegible part is present as a result of the processing at step S110 (step S111). If it is determined that there is no illegible part in the character (NO at S111), the control unit 10 returns the processing to step S106 and continues drawing the image of pen-tip traces on the basis of the sequentially-stored data.

If it is determined that there is an illegible part in the character (YES at S111), the control unit 10 changes the selected thickness of the pen to be thinner (step S112). The control unit 10 draws again the traces of the pen (character) based on the data corresponding to one character which is being input (step S113), returns the processing to step S106, and continues drawing the image of pen-tip traces on the basis of the sequentially-stored data with the changed pen thickness (thinner).

Figure 3:
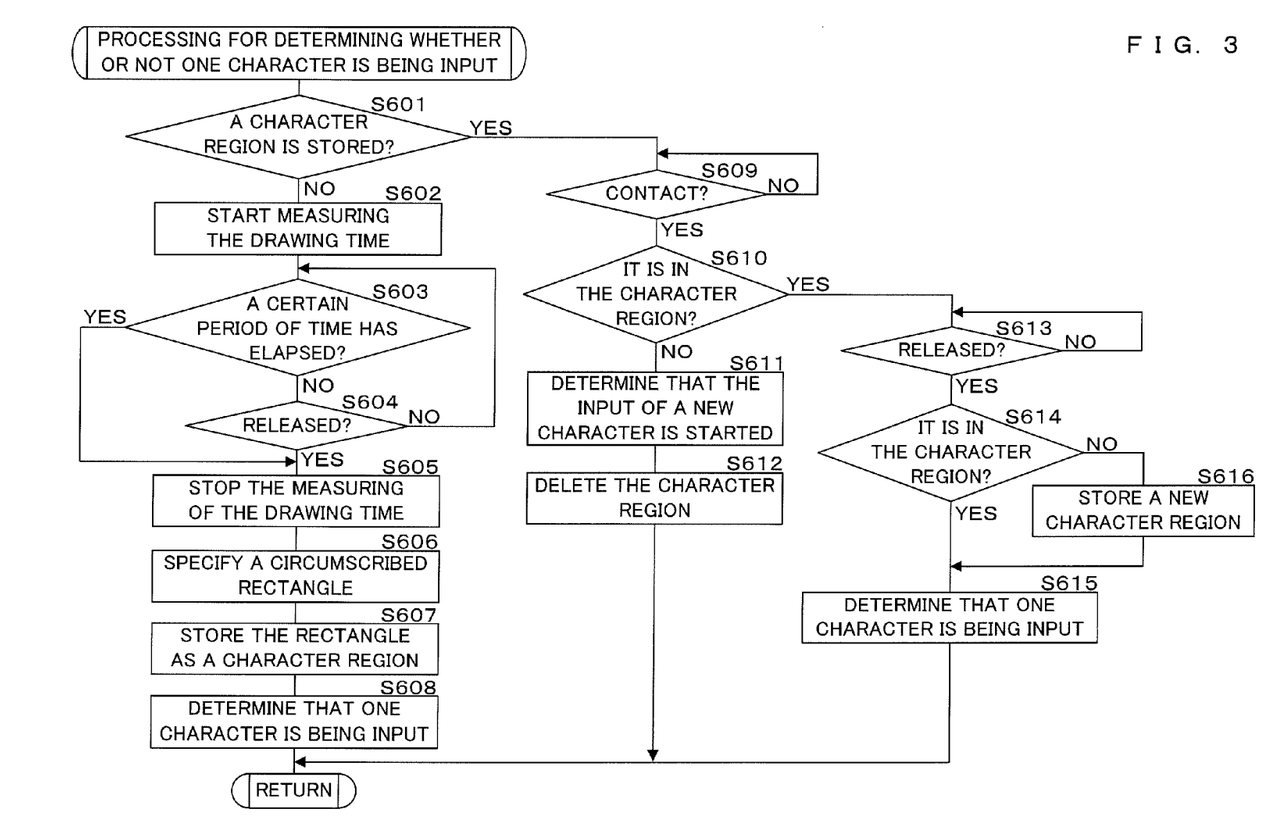
FIG. 3 is a flowchart illustrating an example of a detailed procedure of input determination processing.

FIG. 3 is a flowchart illustrating an example of a detailed procedure of input determination processing.

The control unit 10 determines whether or not a character region at step S607, which will be described later, is temporality stored (step S601). If it is determined that the character region is not stored, i.e. the image of the first stroke in one character is to be drawn (NO at step S601), the control unit 10 starts measuring the drawing time (step S602) and determines whether or not a certain period of time has elapsed (step S603). If it is determined that a certain period of time has not elapsed (NO at step S603), the control unit 10 determines whether or not a finger or touch pen is released from a touch panel at the character input apparatus 4 (step S604). If a finger or touch pen is released from the touch panel, the control unit 10 inputs data as the coordinate information for the last contact point, and thereby determines whether or not the input of a character is completed. If it is determined that the finger or pen is not released at step S604 (NO at step S604), the control unit 10 returns the processing to step S603.

If it is determined that a certain period of time has elapsed (YES at S603), or that the finger or pen is released at step S604 (YES at S604), the control unit 10 stops the measurement of the drawing time (step S605).

The control unit 10 specifies a circumscribed rectangle for the pen-tip traces on the basis of the data (coordinate information) input at steps S602 to S604 (step S606), and further stores a rectangular region obtained by enlarging the specified circumscribed rectangle by a predetermined rate as a character region for one character (step S607).

Figure 4:
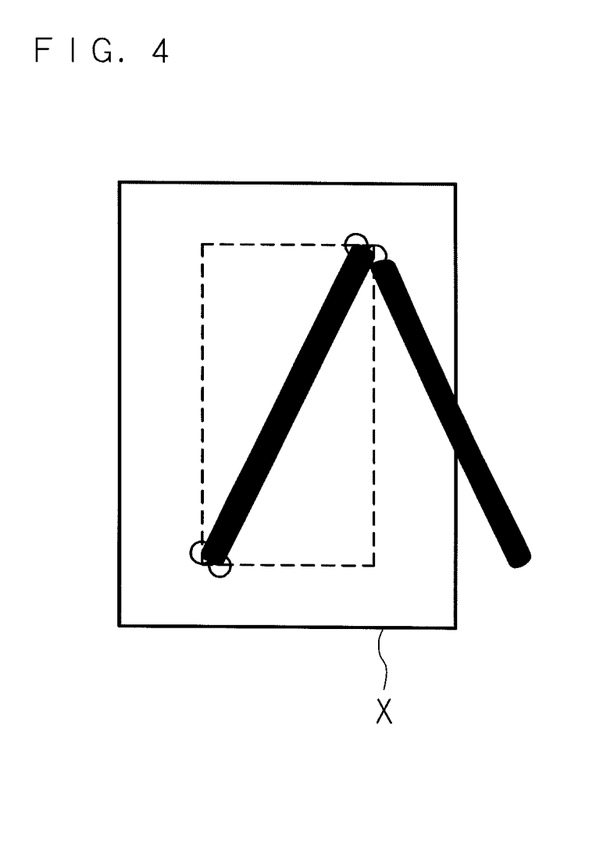
FIG. 4 is an explanatory view illustrating an example of a character region to be stored.
Figure 5:
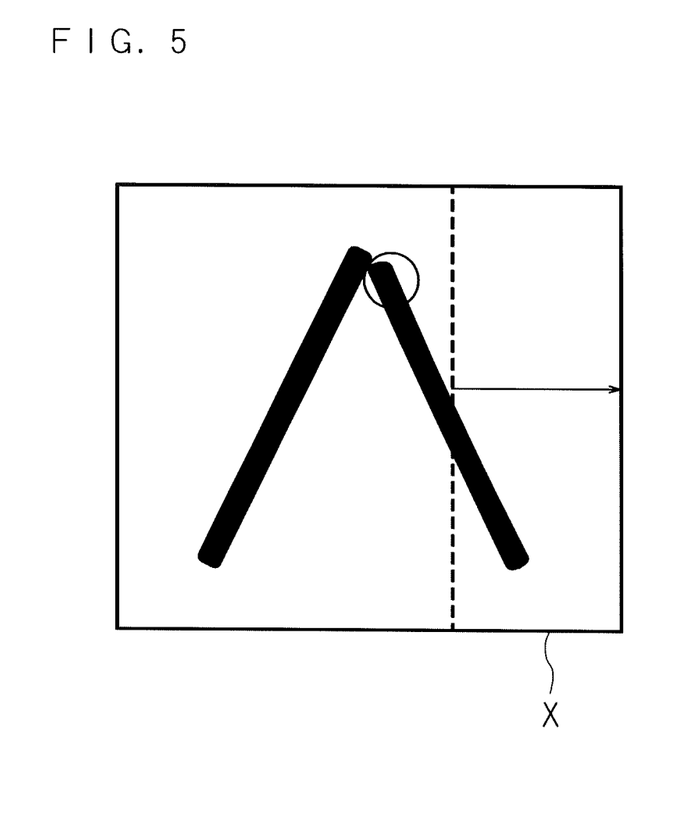
FIG. 5 is an explanatory view illustrating an example of an enlarged character region.

FIG. 4 is an explanatory view illustrating an example of a character region to be stored. FIGS. 4 and 5 illustrate the process in which the image of a handwriting character of the capital letter "A" is drawn. In FIG. 4, a diagonal line in the process is drawn with one stroke. The broken line in FIG. 4 shows a circumscribed rectangle specified at step S606, while the thick line indicated by X shows a character region.

The description now continues with reference again to the flowchart of FIG. 3.

After step S607, the control unit 10 supposedly determines that one character is being input (step S608), and returns the processing to step S109 in the flowchart of FIG. 2. Accordingly, the control unit 10 draws and outputs the image of the first stroke (FIG. 4).

If it is determined that the character region is temporarily stored at step S601 (YES at S601), the control unit 10 determines whether or not a finger or touch pen makes contact with the character input apparatus 4 (step S609). If it is determined that no contact is made (NO at S609), the control unit 10 waits until it is determined that the contact is made. It may also be possible, when a predetermined period of time has elapsed, to determine that one character is not being input (the input of one character is completed), and to return the processing to step S107 in FIG. 2.

If it is determined that contact is made at step S609 (YES at S609), the control unit 10 determines whether or not the initial position (the position where the initial contact is made) of the next one stroke is in the stored character region, based on the coordinate information on the contact position input from the character input apparatus 4 (step S610).

If it is determined that the position is outside the character region (NO at S610), the control unit 10 determines that the input of a new character is started or that the input is for the traces not corresponding to a character and thus no character is being input (step S611), deletes the character region which has already been stored (step S612), returns the processing to step S107 in FIG. 2, determines that the input of data has been started at step S102, and starts drawing new traces.

If it is determined that the position is in the character region at step S610 (YES at S610), the control unit 10 determines whether or not the finger or touch pen is released from the touch panel at the character input apparatus 4 (step S613). If it is determined that the finger or touch pen is not released (NO at step S613), the control unit 10 returns the processing to step S613 and waits until it is determined as released.

If it is determined that the finger or touch pen is released at step S613 (YES at S613), the control unit 10 determines whether or not the final position of the stroke (the last contact position) is in the stored character region (step S614). If it is determined that the final position is in the character region (YES at step S614), the control unit 10 determines that one character is being input (step S615) and returns the processing to step S109 in FIG. 2.

If it is determined that the final position is outside the character region at step S614 (NO at S614), the control unit 10 stores a region including a rectangular region obtained by enlarging the circumscribed rectangle of the pen-tip traces in steps S609 and S613 by a predetermined rate and also including the stored character region, as a new character region (step S616).

FIG. 5 is an explanatory view illustrating an example of an enlarged character region. In FIG. 5, in addition to the first stroke of the left diagonal line in the character "A" shown in FIG. 4, a stroke of a right diagonal line is further drawn. As enclosed with the circle, it is determined that the initial position of the new stroke is in the character region (YES at S610), while the final position of the new stroke is outside the character region (NO at S614). Thus, the character region X is enlarged as indicated by the thick lines.

The description now continues with reference again to the flowchart of FIG. 3.

After storing the new character region at step S616, the control unit 10 proceeds to step S615 where it is determined that one character is being input (S615), and returns the processing to step S109 in FIG. 2.

Figure 6:
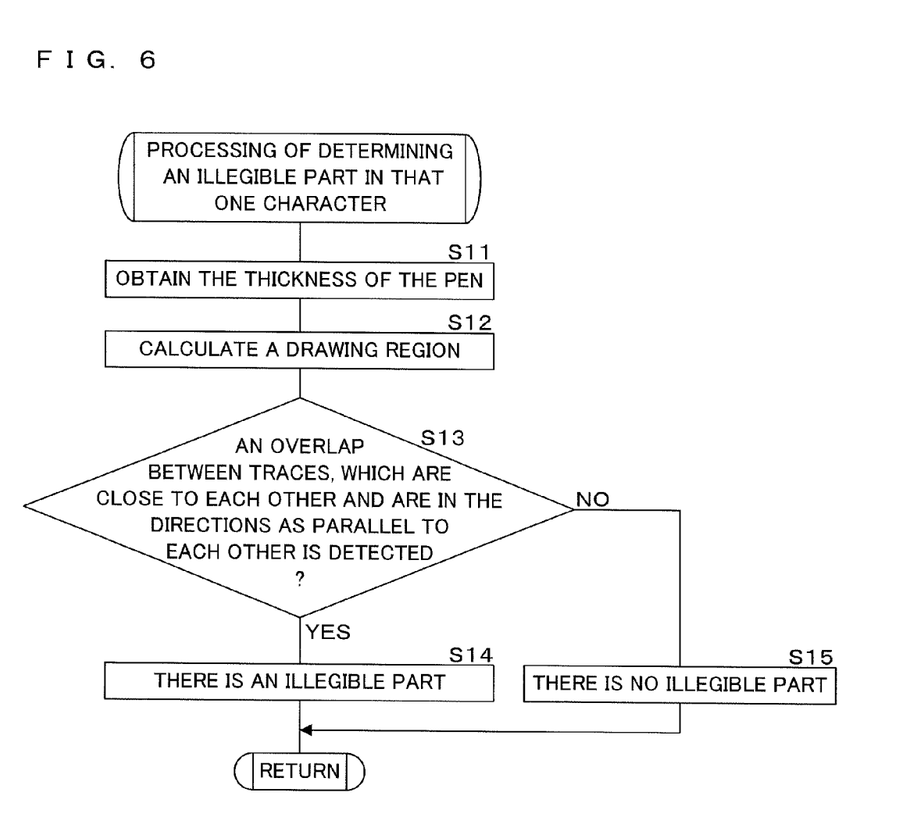
FIG. 6 is a flowchart illustrating an example of processing of determining presence/absence of an illegible part in a character, performed by a control unit of a character display apparatus according to an embodiment of the present invention.

FIG. 6 is a flowchart illustrating an example of processing of determining presence/absence of an illegible part in a character, performed by the control unit 10 of the character display apparatus 1 according to the present embodiment.

The control unit 10 obtains the thickness of the pen which is currently selected (step S11). The control unit 10 calculates a drawing region for each of pen-tip traces (one stroke) of one character which is being input, based on the obtained thickness of the pen (step S12).

The control unit 10 detects an overlap between the traces, which are close to each other and are in the directions determined as parallel to each other, in the drawing region for each of the pen-tip traces calculated at step S12 (step S13).

If an overlap is detected (YES at S13), the control unit 10 determines that there is an illegible part (step S14), and returns the processing to step S111 in the flowchart of FIG. 2.

If no overlap is detected (NO at S13), the control unit 10 determines that there is no illegible part (step S15) and returns the processing to step S111 in the flowchart of FIG. 2.

Figure 7:
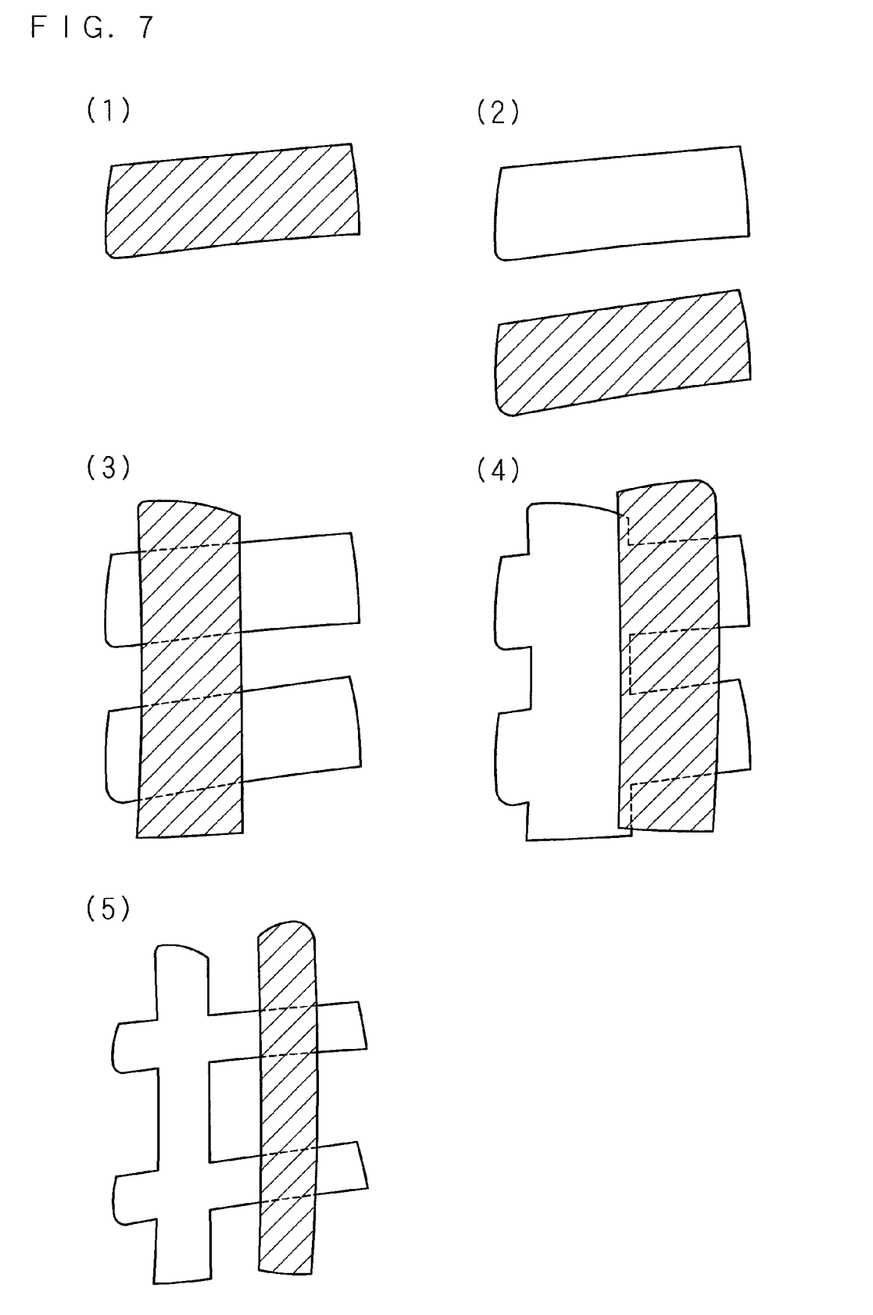
FIG. 7 is an explanatory view illustrating an example of an illegible character avoided by a character display apparatus according to an embodiment of the present invention.

Determination on presence/absence of an illegible part in a character in the flowchart of FIG. 6 will now be described with a specific example. FIG. 7 is an explanatory view illustrating an example of an illegible character avoided by the character display apparatus 1 according to the present embodiment. FIG. 7 shows the process of inputting data of a handwriting character for a symbol "#," in which (1) to (4) sequentially illustrates the strokes of the character one by one, while (5) illustrates the final image. The hatched area in each image shows the region where the most recent one stroke is input.

As shown in FIG. 7, when the vertical bar of the fourth stroke is input, the control unit 10 detects an overlap occurs between the traces that are close to each other and are in the directions determined as parallel to each other (YES at S13). The control unit 10 thus determines that there is an illegible part, and corrects the thickness of the character to be thinner and draw the image again. This prevents an illegible part from occurring. While an overlap is also present between the character drawing regions at (3) for the third stroke, the traces are not determined as being in the same direction. It is, therefore, not determined that the character is illegible even if an overlap occurs.

Figure 8:
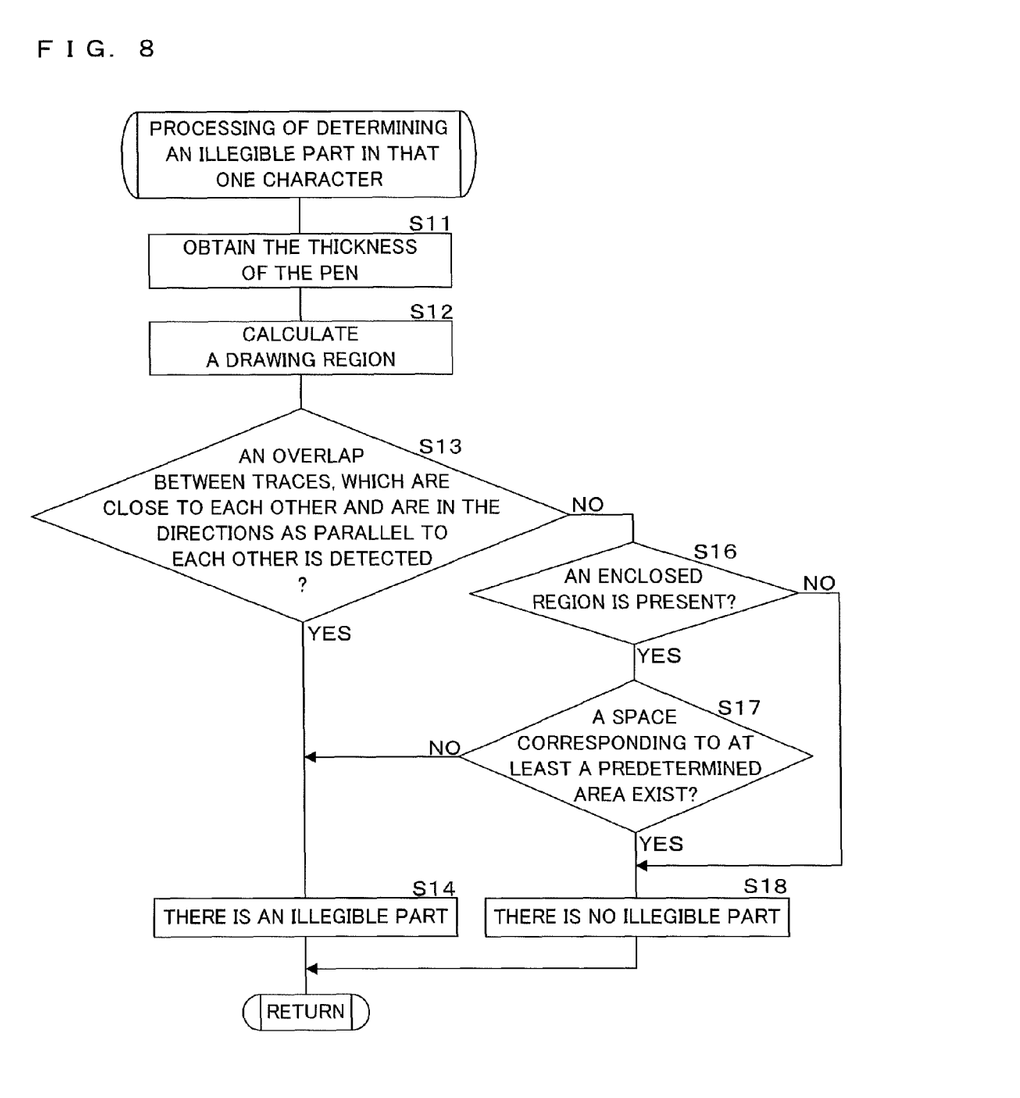
FIG. 8 is a flowchart illustrating another example of processing of determining presence/absence of an illegible part in a character, performed by a control unit of a character display apparatus according to an embodiment of the present invention.

An illegible part of a character may also be generated, not only in the case where an overlap occurs at the lines determined as parallel as shown in FIG. 7, but also in a region enclosed by lines or curves. FIG. 8 is a flowchart illustrating another example of determination processing on presence/absence of an illegible part in a character, performed by the control unit 10 of the character display apparatus 1 according to the present embodiment. In the processing steps shown in the flowchart of FIG. 8, the ones common to the procedures shown in the flowchart of FIG. 6 are denoted by the same step numbers and will not be described in detail.

If no overlap is detect at step S13 (NO at S13), the control unit 10 determines whether or not a region enclosed by pentip traces, i.e. traces connecting coordinate information, are in the character which is being input (step S16).

If it is determined that an enclosed region is present (YES at S16), the control unit 10 judges whether or not a space corresponding to at least a predetermined area (e.g., several pixels) exists in the enclosed region (step S17). If it is judged that such a space does not exist (NO at S17), the control unit 10 determines that there is an illegible part in the character (step S14), and returns the processing to step S111 in the flowchart of FIG. 2.

If it is determined that an enclosed region is not present at step S16 (NO at S16), or judged that a space exists at step S17 (YES at S17), the control unit 10 determines that there is no illegible part (step S18) and returns the processing to step S111 in the flowchart of FIG. 2.

Figure 9:
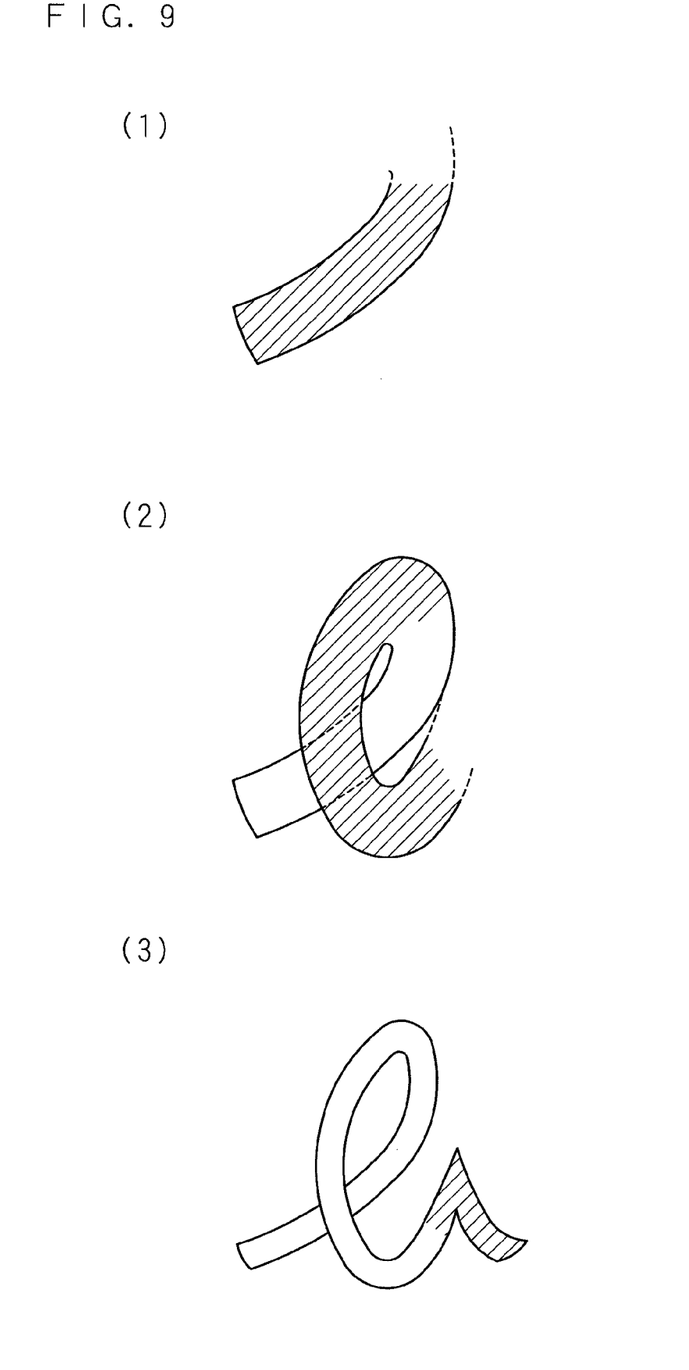
FIG. 9 is an explanatory view illustrating another example of an illegible character avoided by a character display apparatus according to an embodiment of the present invention.

The determination made in the flowchart of FIG. 8 on presence/absence of an illegible part in a character will now be described with a specific example. FIG. 9 is an explanatory view illustrating another example of an illegible character avoided by the character display apparatus 1 according to the present embodiment. In FIG. 9, the process of inputting and drawing the data image of a handwriting character for the alphabet small character "b" is shown at (1) to (3). Each of the hatched areas indicate the most recent drawing region.

As shown in FIG. 9, the control unit 10 determines that an enclosed region is present in the traces (YES at S16), and also judges that a space corresponding to at least a predetermined area does not exist when the image is drawn with the selected thickness (NO at S17). Thus, the control unit 10 determines that there is an illegible part in the character and draws the image of the character again with thinner lines as indicated at (3).

Accordingly, if it is determined that a character is illegible while accepting a handwriting character, the handwriting character is automatically made thinner to be displayed. Moreover, as shown in the flowchart of FIG. 2, whether or not the input is completed is determined for each character, and the line thickness of the character is returned to the original thickness when the input for one character is completed (S101). In the case where a character string is input, the thickness may remain changed. Thus, there is no need to set the thickness every time a character or a curve is input, and the thickness is automatically adjusted so as to avoid illegible characters. It may also be possible to select the thickness afterwards so that the other characters in the character string have the same thickness.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A character display apparatus, comprising:
   an acceptance processor configured or programmed to sequentially accept trajectory data of a handwriting character;
   a drawing processor configured or programmed to draw an image of a handwriting character with a preset thickness based on the trajectory data accepted by the acceptance processor;
   a display configured to display the image of the handwriting character drawn by the drawing processor;
   a determination processor configured or programmed to determine presence/absence of an illegible part in the image of the handwriting character drawn by the drawing processor;
   a change processor configured or programmed to change a thickness of a handwriting character to be drawn subsequently by the drawing processor to be thinner, when the determination processor determines that an illegible part is present in the image; and
   a re-drawing processor configured or programmed to draw again an already-drawn portion of the image of the handwriting character with a thickness after change.

2. The character display apparatus according to claim 1, wherein
   the determination processor further includes an overlap detection processor configured or programmed to detect an overlap between adjacent lines in substantially same directions in the handwriting character drawn by the drawing processor, and to determines that an illegible part is present when the overlap detection processor detects the overlap.

3. The character display apparatus according to claim 1, wherein
   the determination processor further includes a space judgment processor configured or programmed to judge a space enclosed by a line or a curve at a part of the image of the handwriting character drawn by the drawing processor has an area equal to or smaller than a predetermined area, and to determine that an illegible part is present when the space judgment processor judges the area is equal to or smaller than the predetermined area.

4. The character display apparatus according to claim 1, further comprising:
   an input complete determination processor configured or programmed to determine determining whether or not an input of trajectory data accepted by the acceptance processor is completed; and
   a reset processor configured or programmed to reset a thickness of an image of a handwriting character to be drawn newly by the drawing processor to the preset thickness, when the input complete determination processor determines that the input is completed.

5. The character display apparatus according to claim 4, wherein
   the input complete determination processor is configured or programmed to determine whether or not an input of trajectory data of a handwriting character is completed for each character.

6. The character display apparatus according to claim 4, wherein the input complete determination processor is configured or programmed to determine whether or not an input of trajectory data of a handwriting character string is completed for each string.

7. A character display method for displaying a character on a computer comprising an acceptance processor configured or programmed to sequentially accept accepting trajectory data of a handwriting character and a display configured to display a drawn image of a handwriting character, comprising the steps of:

drawing an image of a handwriting character with a preset thickness based on the trajectory data accepted by the acceptance processor;

causing the display to display the drawn image of the handwriting character;

determining presence/absence of an illegible part in the drawn image of the handwriting character;

changing a thickness of a handwriting character to be drawn subsequently to be thinner, when determined that an illegible part is present in the image;

drawing again an already-drawn portion of the image of the handwriting character with the thickness after change; and causing the display to display an image of the handwriting character which is drawn again.

8. A non-transitory computer readable medium storing a computer program causing a computer to perform method of drawing an image of a handwriting character, the computer comprising an acceptance processor configured or programmed to sequentially accept trajectory data of a handwriting character and a display configured to display a drawn image of a handwriting character, the method comprises the steps of drawing an image of a handwriting character with a preset thickness based on the trajectory data accepted by the acceptance processor;

causing the display to display the drawn image of the handwriting character;

determining presence/absence of an illegible part in the drawn image of the handwriting character;

changing a thickness of a handwriting character to be drawn subsequently to be thinner, when determined that an illegible part is present in the image;

drawing again an already-drawn portion of the image of the handwriting character with the thickness after change; and causing the display to display an image of the handwriting character which is drawn again.

* * * * *